Aug. 4, 1959 M. J. LANG 2,897,500
STAPLING DEVICE
Filed Jan. 19, 1956 6 Sheets-Sheet 5
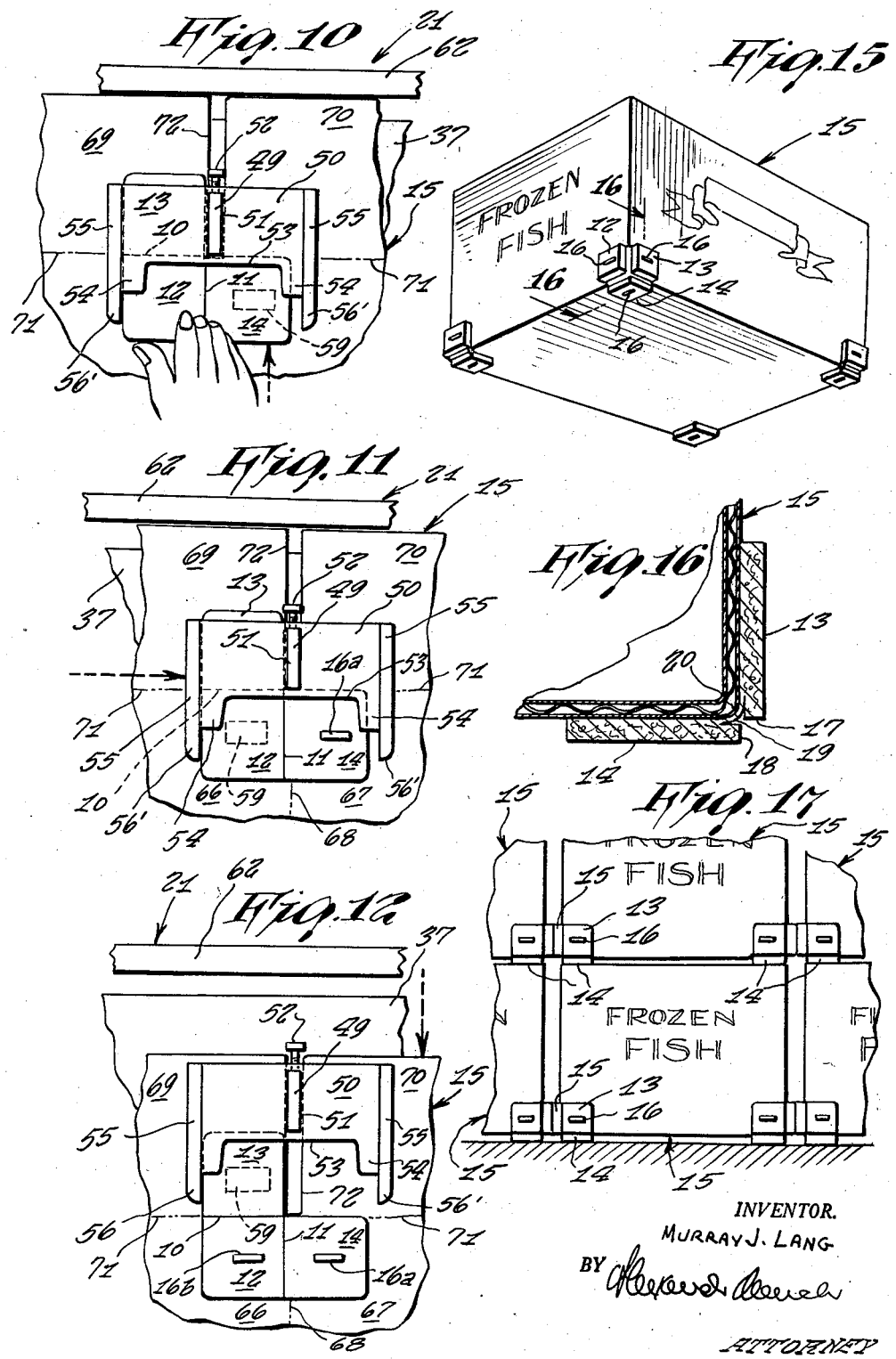

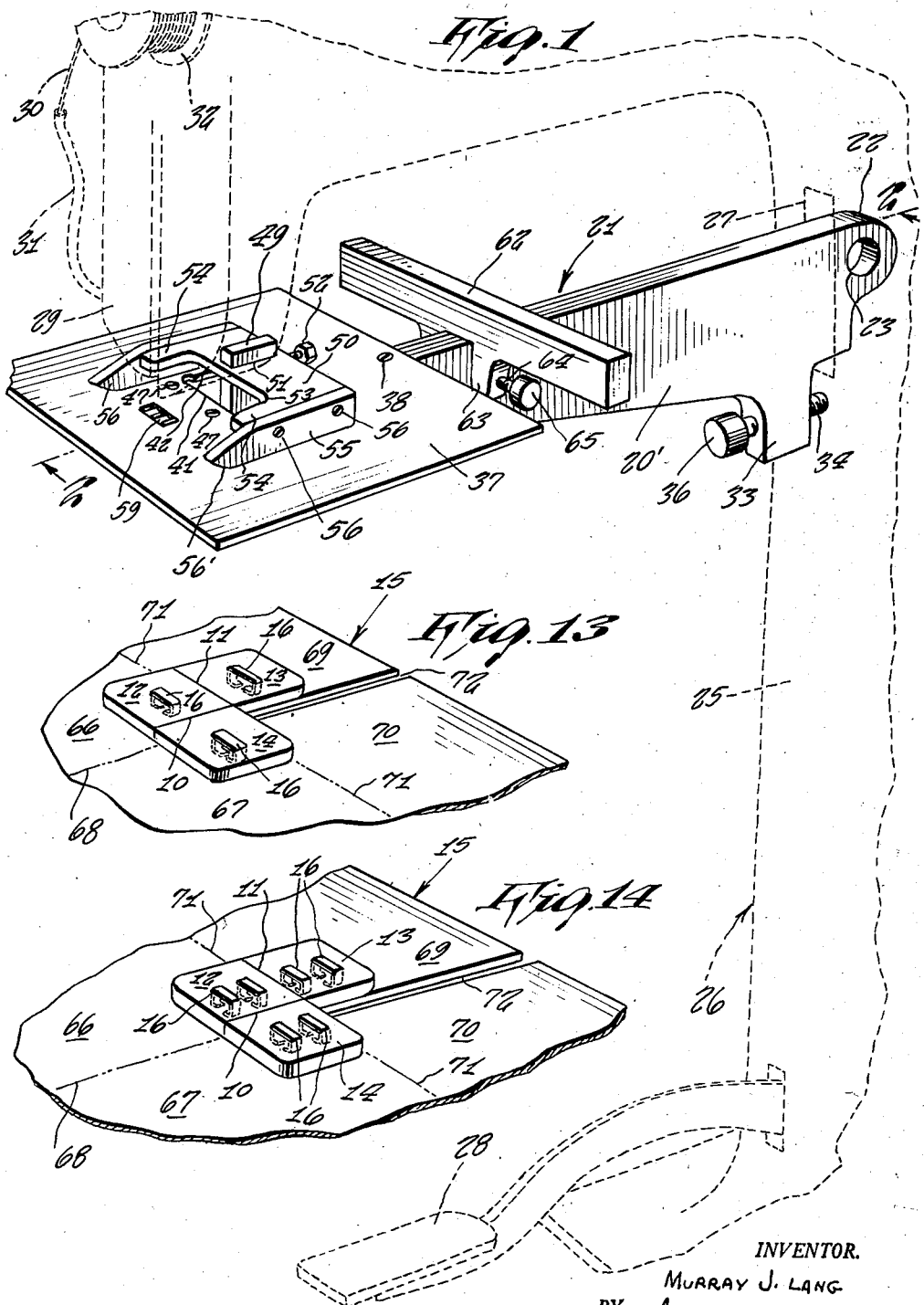

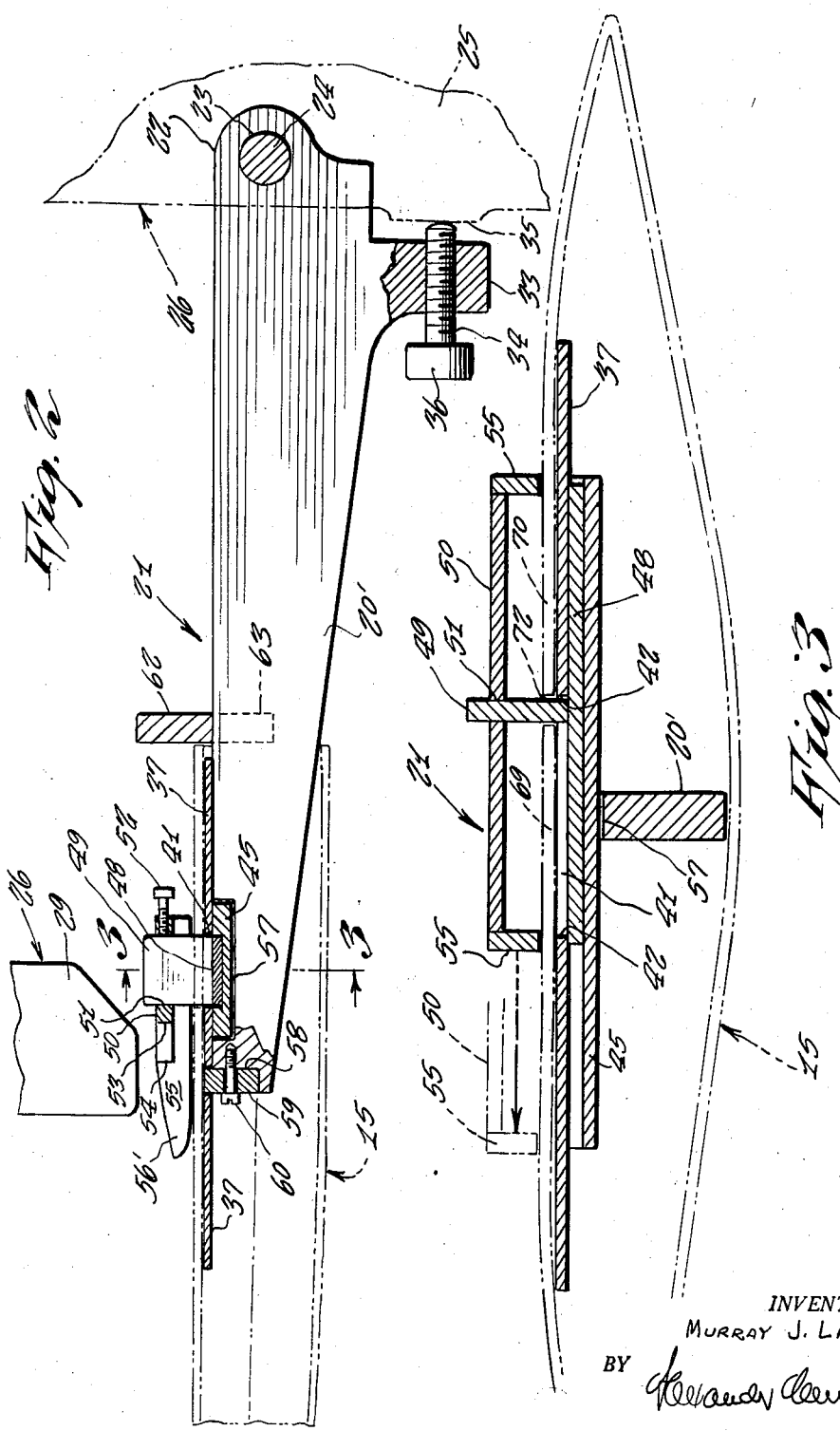

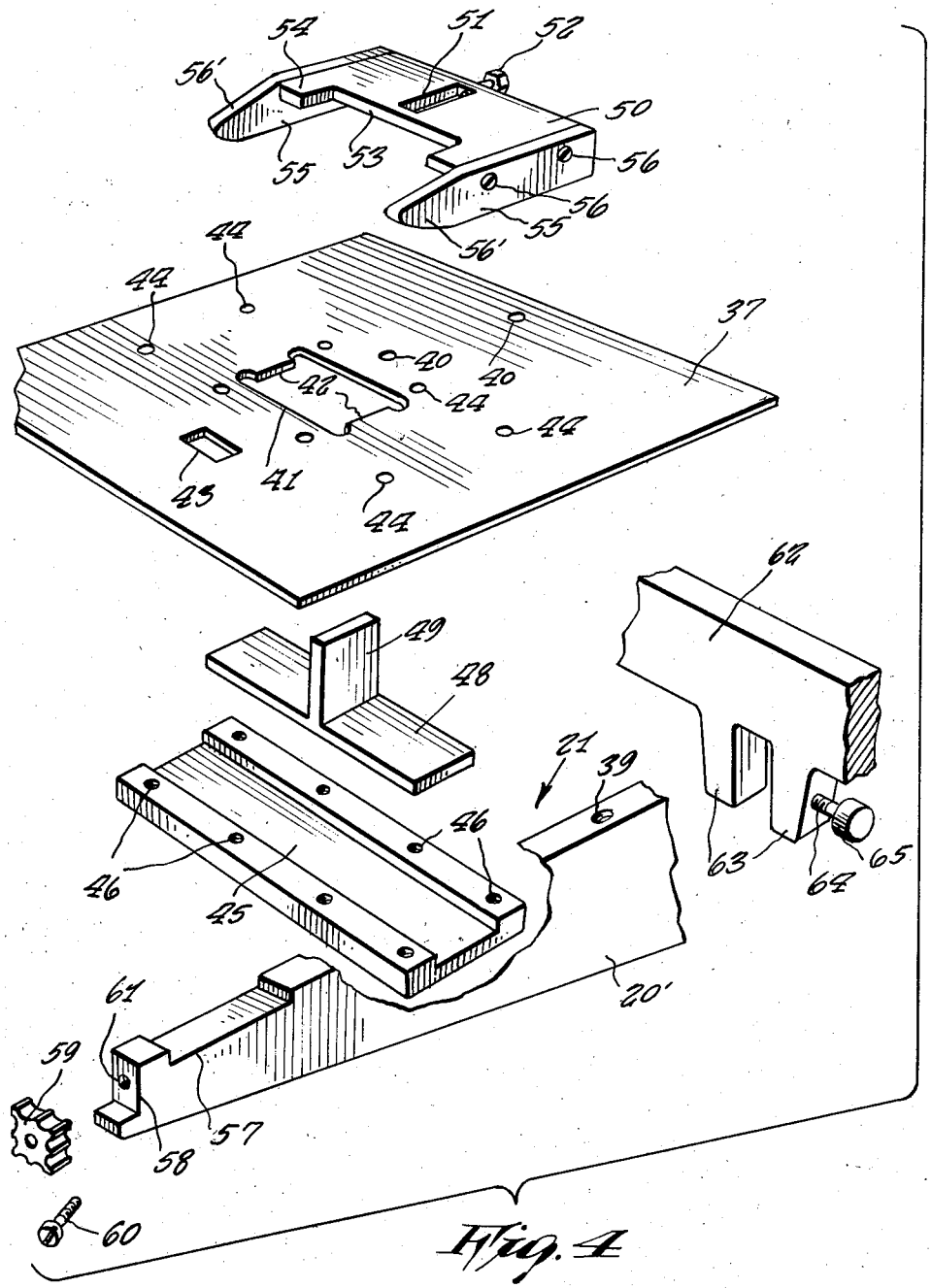

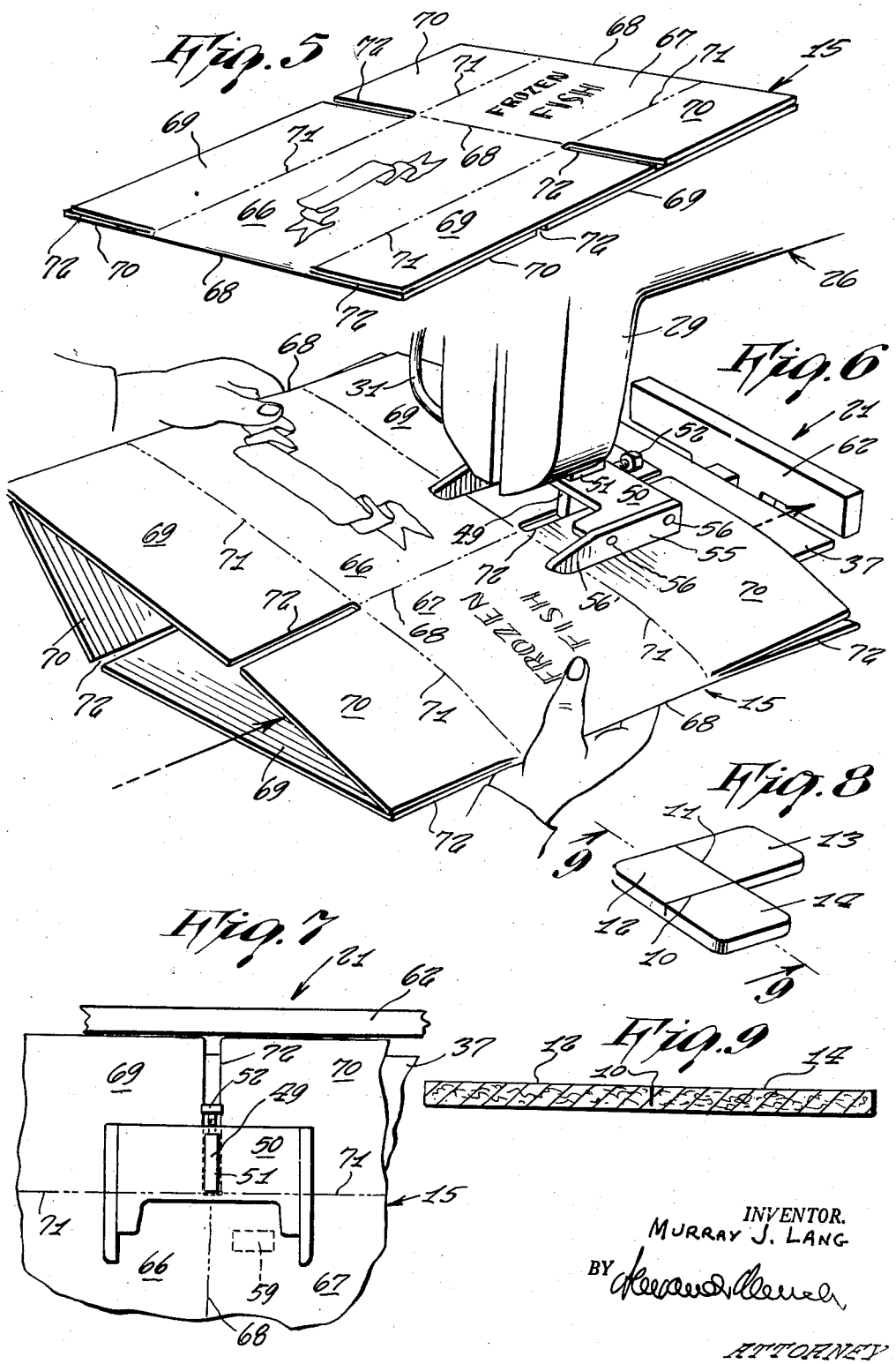

Aug. 4, 1959 M. J. LANG 2,897,500
STAPLING DEVICE
Filed Jan. 19, 1956 6 Sheets-Sheet 6

INVENTOR.
MURRAY J. LANG
BY
ATTORNEY

United States Patent Office 2,897,500
Patented Aug. 4, 1959

2,897,500

STAPLING DEVICE

Murray J. Lang, New York, N.Y.

Application January 19, 1956, Serial No. 560,090

3 Claims. (Cl. 1—2)

This invention relates to frozen foods and more particularly to means for insuring the complete circulation of refrigerated air through stacks of such frozen foods during storage and shipment.

The storage of stacks of frozen foods in refrigerated compartments during shipment and storage suffers from the following serious disadvantage: when the packages of frozen foods are stacked one on top of the other in side by side relationship, the refrigerated air circulated through the refrigerated compartment contacts only the uppermost and outermost packages of frozen food in the stacks, while the innermost packages are not contacted. As a result, the innermost packages of frozen foods are not kept at the same reduced temperature as the outermost ones, resulting in a serious spoilage of frozen foods during storage and shipment.

It is accordingly a principal object of the present invention to provide means for insuring the complete circulation of refrigerated air throughout the entire stacks of frozen foods and wherein the innermost packages will be kept at the same reduced temperatures as the outermost ones.

It is another object of the present invention to provide corner members which, when applied to the corners of the packages of frozen foods, will support the same, one above the other and in side by side relationship, in such a manner as to permit the complete circulation of refrigerated air between the packages so as to permeate to the interiors of the stacks and to prevent the spoilage of food.

It is still another object of the present invention to provide a machine for applying the corner members to the knocked-down frozen food cartons to more efficiently carry forward the objects of the invention and to effect an economy of time and labor.

It is still another object of the present invention to provide a machine of the above type which is adjustable to cartons of varying thickness.

Other objects of the invention are to provide means for insuring the complete circulation of refrigerated air throughout the entire stacks of frozen foods which are of simple construction, have a minimum number of parts, and are efficient in use.

For other objects and a better understanding of the invention, reference may be had to the following detailed description taken in connection with the accompanying drawing, in which:

Figure 1 is a perspective view of a preferred embodiment of a machine for applying the corner members to the knocked-down cartons;

Figure 2 is a longitudinal sectional view shown partly in elevation and taken along the line 2—2 of Figure 1;

Figure 3 is a transverse sectional view taken along the line 3—3 of Figure 2;

Figure 4 is a fragmentary exploded perspective view of the parts comprising the machine;

Figure 5 is a perspective view of one of the knocked-down cartons before application thereto of the corner members forming another part of the invention;

Figure 6 is a perspective view showing the knocked-down cartons in operative position on the machine just prior to the application thereto of the corner members;

Figure 7 is a fragmentary top plan view of the knocked-down carton in position on the machine, and ready for the application thereto of the corner members;

Figure 8 is a perspective view of one of the corner members shown alone;

Figure 9 is an enlarged vertical sectional view taken along the line 9—9 of Figure 8 and illustrating one of the score lines;

Figure 10 is a view similar to Figure 7 but showing the positioning on the machine of the corner members prior to securement to the carton;

Figure 11 is a view similar to Figure 10 but showing one section of the corner member stapled to the carton;

Figure 12 is a view similar to Figure 10 but showing another section of the corner member stapled to the carton with the carton moved into position for the stapling of the third section;

Figure 13 is a fragmentary perspective view showing the corner member secured to the knocked-down carton;

Figure 14 is a fragmentary enlarged perspective view showing the corner member secured to the knocked-down carton by a double stapling device;

Figure 15 is a perspective view of one of the filled frozen food packages with the corner members applied thereto;

Figure 16 is an enlarged fragmentary vertical sectional view taken along the line 16—16 of Figure 15;

Figure 17 is a fragmentary front elevational view showing a plurality of frozen food packages in stacked arrangement and illustrating the manner in which the air is circulated therethrough on all sides throughout the entire stack;

Figure 18:
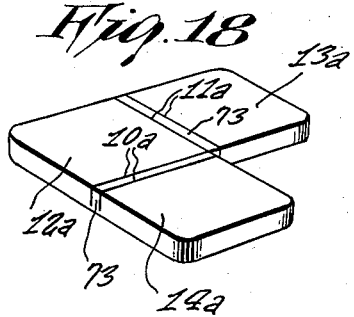
Figure 18 is a perspective view of a modified form of corner member.

Referring now more in detail to the drawing, and more particularly to Figures 8 and 9, there is shown a corner member of substantially L-shaped configuration of laminated cardboard or other suitable material and provided with the score lines 10 and 11 which divide the member into the sections 12, 13 and 14 adapted to be folded at right angles to each other along the score lines 10 and 11, as shown in Figures 15 and 16. The corner members are secured to the frozen food cartons indicated generally at 15 by means of the staples 16. It will be noted from Figure 16 that the score lines 10 and 11 permit the separation of the sections along the edges 17 and 18, while at the same time providing a relatively thin connecting layer 19 which fits around the rounded edge 20 of the corrugated frozen food packages 15. This construction is provided by extending the score lines 10 and 11 through the major thickness of the corner members but terminating just short of the other surface thereof, as shown in Figure 9.

The corner members are stapled to the four lower corners of each of the frozen food packages 15.

Thus, when the packages 15 are stacked, as shown in Figure 17, one on top of the other in side by side relationship, the sections 14 of the corner members support the bottom of the cartons in freely spaced relationship above the top of the carton directly therebelow while the sections 12 and 13 support the sides of the cartons in freely spaced relationship from the sides of the adjacent cartons, thus insuring the complete circulation of refrigerated air throughout the entire stacks and preventing the innermost packages from spoiling.

It will be noted that the L-shaped configuration of the corner members plus the score lines 10 and 11 provides a relatively simple, inexpensive construction which may be easily and readily applied to the corners of the conventional cartons 15.

In the further practice of my invention, a device is provided for stapling the corner members to the knocked-down cartons and which may readily be mounted upon conventional staple presses so as to permit the corner members to be applied to the cartons with an economy of time and labor consistent with the inexpensive cost of the corner members themselves.

As shown in Figure 1, this device is indicated generally at 21 and includes a supporting arm 20' formed at one end with a semicircular extension 22 having an opening 23 which receives therethrough a bolt 24 mounted in the standard 25 of a conventional foot operated staple press indicated generally at 26, the standard 25 having a slot 27 which receives inwardly therethrough the extension 22 of the supporting arm 20'.

The staple press 26 includes the usual operating foot pedal 28, the stapling head 29 as well as the continuous staple wire 30 which is fed through the tubular portion 31 from the drum 32, all in a manner well known to those skilled in the art.

The arm 20' is rotatably mounted on the bolt 24 and is supported in a substatially horizontal position by means of the integrally formed, depending portion 33 through which is screw-threaded the adjustable stop 34, the inner end of the stop 34 resting on the anvil 35 provided in the standard 25 (Figure 2). Thus, the angulation and the distance of the supporting arm 20' from the stapling head 29 may be adjusted by means of the stop 34 which is provided with the enlarged manually operable head 36.

A rectangular base plate 37 is mounted on the upper edge of the outer end of the supporting arm 20' below the stapling head 29 by means of the screws 38 which are received in the internally threaded openings 39 provided therefor (Figure 4). The plate 37 is provided with the openings 40 which receive therethrough the mounting screws 38.

The base plate 37 is provided with a rectangular opening 41 and is integrally formed at the opposite ends of the opening 41 with the stops 42, for a purpose which will hereinafter become clear. The base plate 37 is also provided with a rectangular opening 43 which underlies the operative end of the stapling head 29. The plate 37 surrounding the opening 41 is also provided with the rectangularly arranged mounting openings 44.

A transverse track 45 of U-shaped cross section is provided along the opposite edges thereof with the internally threaded mounted openings 46 which are adapted to be aligned with the mounting openings 44 of plate 37, the track being secured to the undersurface of the plate 37 by means of the mounting screws 47. A rectangular slide 48 is slidably positioned on the track 45 and fixedly carries at the center thereof an upstanding portion 49 which reciprocates against the stops 42 provided in the plate 37 in a manner which will hereinafter become clear. The slide 48 is, of course, positioned on the track 45 before the latter is secured to the plate 37, with the upwardly extending portion 49 extending upwardly through the opening 41.

A guide plate 50 is provided with a central slot 51 (Figure 4) which receives upwardly therethrough the upwardly extending portion 49, the elevation of the guide plate 50 being controlled by a set screw 52 which is screw threaded through one longitudinal edge of plate 50 and which communicates with the slot 51, bearing on the vertical edge of the upwardly extending portion 49, as will be obvious.

The forward edge of the guide plate 50 is provided with a re-entrant cutout 53 defining the corner portions 54 at each end. A pair of depending stops or guides 55 are secured to the opposite ends of the guide plate 50 at right angles thereto by means of the mounting screws 56, the stops 55 extending forwardly beyond the guide plate 50 and terminating in the blunt point portions 56'.

The upper edge of the supporting arm 20' (Figure 4) is provided with a groove 57 which accommodates the track 45, as will be obvious. The free end of the supporting arm 20' is also provided with a rectangular cutout 58 which receives therewithin the four-sided anvil 59 which extends upwardly through the opening 43 in the base plate 37 to cooperate with the stapling head 29 in a well known manner, the anvil 59 being secured within the cutout 58 by means of the screw 60 passing therethrough and received within the internally threaded opening 61 provided in the end of the supporting arm. Upon loosening the nut 60, the anvil 59 may be rotated through ninety degrees when it becomes worn.

An adjustable stop 62 is integrally formed with the laterally spaced depending portions 63 which receive therebetween the upper edge of the supporting arm 20' in sliding engagement, the position of the stop 62 being set by means of the set screw 64 having the enlarged operable head 65 which is screw threaded through one of the depending portions 63 and bears on the side of the supporting arm 20'.

It will be noted that the guide plate 50 and depending stops 55 are mounted on the slide 48 which latter may move from one extreme position to the other controlled by the abutment of the upwardly extending portion 49 with the end stops 42 of the base plate 37.

Before describing the operation of the device, it will be necessary to consider the construction of the knocked-down cartons 15 (Figure 5). As shown, each carton includes the side walls 66 connected to the end walls 67 along the fold lines 68. Each of the side and end walls 66 and 67 is integrally formed with the closure flaps 69 and 70 along the fold lines 71 at both the upper and lower edges thereof. The closure flaps 69 and 70 are separated by the re-entrant cuts 72, four such cuts being provided at both the upper and lower ends of the carton, as shown in Figure 5.

In operation, as shown in Figure 6, the knocked-down carton 15 is placed onto the base plate 37, completely surrounding the same. The re-entrant cut 72 of the particular corner which it is desired to attach the corner members to is aligned with the upstanding portion 49 of the slide and moved inwardly until it abuts the stop 62, at which point the outer edge of the upstanding portion 49 will be in registry with the inner end of the re-entrant cut 72. It will be noted that the inward movement of the carton is limited, not by the abutment of the inner end of the re-entrant cut 72 with the vertical edge of the upstanding member 49, but rather by the abutment of the inner edges of the closure flaps 69 and 70 with the stop 62, which latter is adjustable, depending on the length of the cut 72. This will prevent damage to the inner ends of the slots, as will be obvious. This positioning is illustrated in Figure 7.

As shown in Figure 10, the corner member is then slid into position intermediate the guide plate 50 and the top of the carton 15 with the sides of the section 13 of the corner member slidably abutting the left hand depending stop 55 at one side and the upstanding member 49 at the other, whereby to automatically laterally position the corner member on the carton. The longitudinal positioning of the corner member is effected by the abutment of the edge of the section 14 with the outer edge of the upstanding member 49 (Figures 10 and 11). It will be noted that the slide 48 is positioned at the extreme left hand end of the track 45, this position being effected by contact of the upstanding member 49 with the left hand stop 42. In this arrangement of the parts, the anvil 59 will underlie the section 14 (Figure 10). The press is then operated by the foot pedal 28 to drive the staple 16a and to connect the section 14 with the end panel 67 of the carton. The slide 48 is then moved to the extreme right hand position until the upstanding portion 49 abuts the other stop 42. This movement is indicated by the arrow of Figure 11, and it will be noted brings the anvil 59 under the section 12 whereupon the foot pedal is again depressed to drive the staple 16b (Figure 12). The carton and the corner member attached thereto are then moved away from the stop 62 to the position of Figure 12 until the corner portions 54 of the guide plate 50 overlie the corner of the section 13, at which point the anvil 59 will be directly therebelow. The foot pedal is again operated to drive the third staple 16c (Figure 13) whereupon the carton and corner member attached are removed from the machine. The operation is then repeated for each of the three remaining re-entrant slots 72 at the bottom of the carton.

As shown in Figure 14, the same operation may be performed on a double stapling device to impart the double staples 16 to each of the sections 13, 14 and 12, as will be obvious.

It will be noted that the corner members will be knocked-down along with the carton until the latter is set up, as shown in Figure 15, at which time the sections will assume the right angle positions with respect to each other, thus, in no way increasing the bulk of the knocked-down cartons.

Figure 19:
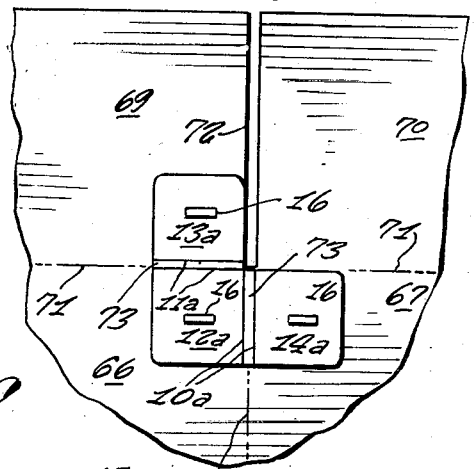
Figure 19 is a fragmentary top plan view showing the application of the modified corner member of Figure 18 to the knocked-down carton.
Figure 20:
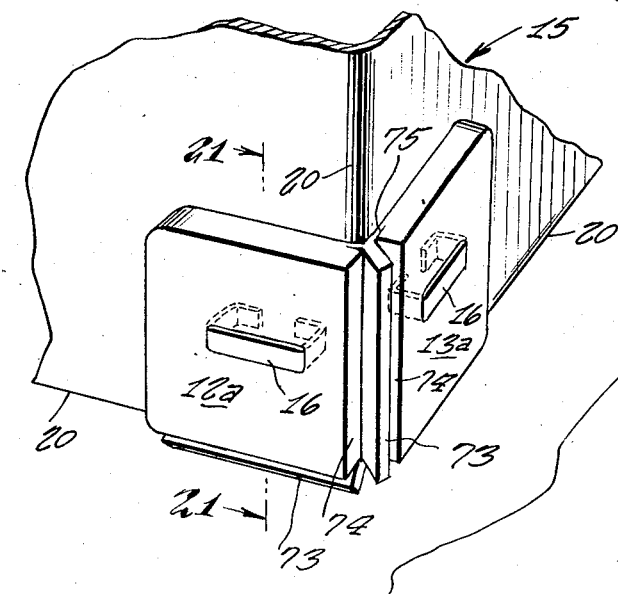
Figure 20 is an enlarged fragmentary perspective view showing the corner member mounted on the set up carton.
Figure 21:
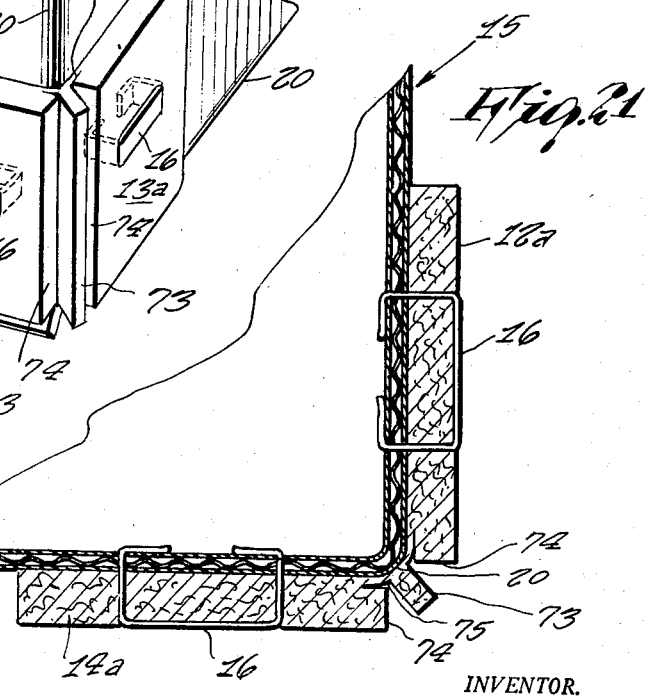
Figure 21 is an enlarged vertical sectional view taken along the line 21—21 of Figure 20.

Referring now particularly to Figures 18–21, there is shown a modified form of corner member adapted to be used with the present apparatus. Here, the L-shaped blank of laminated cardboard or other suitable material is provided with double intersecting score lines 10a and 11a to define the sections 12a, 13a and 14a. In this case, however, the flexing of the corner members onto the set up box or carton results in the formation of the fins 73 intermediate the free ends 74 of the sections (Figure 21) whereby to reinforce the corner portions and to provide a spacing member thereat which insures complete circulation of refrigerated air along these corner portions. Here again a relatively thin layer 75 is provided for connecting the sections together and which conforms to the curvature of the rounded corner 20 of the carton.

In other respects the form of the invention shown in Figures 18–21 is the same as that shown in Figures 1–17, and like reference numerals identify like parts throughout the several views.

While various changes may be made in the detailed construction, it shall be understood that such changes shall be within the spirit and scope of the present invention as defined by the appended claims.

I claim:

1. A device for stapling L-shaped corner spacer members to knocked-down cartons comprising in combination, a staple press including a standard, a foot pedal actuating the press, a stapling head, a supporting arm, means for securing said supporting arm to said standard at substantially right angles thereto with the free end of said supporting arm extending outwardly below said stapling head, transverse track means mounted on said supporting arm below said stapling head, slide means adapted to move along said track means, an upstanding member carried by said slide means, base plate means secured to said supporting arm above said track means, said base plate means having an opening therethrough adapted to permit the sliding movement of said upstanding member to either of two extreme positions, and positioning means carried by said upstanding member and adapted to receive thereunder the knocked-down carton with the upstanding member being received intermediate the ends of the closure flaps whereby to position the knocked-down carton on said base plate means, said positioning means including a pair of depending stops at each end adapted to cooperate with said upstanding member to slidably receive therebetween and position the corner spacer member in proper relationship to said knocked-down carton and to permit the movement of the carton and spacer member together to three different positions whereby to secure the three sections of the spacer member to the side, end and closure portions of the knocked-down carton, and anvil means carried by said supporting arm adapted to cooperate with said stapling head.

2. A device according to claim 1, said transverse track means comprising said supporting arm having a recessed portion on the upper edge thereof below said stapling head, a transverse track of U-shaped cross section positioned within said recessed portion, said slide means comprising a slide adapted to slide within said track and carrying said upstanding member, said base plate means comprising a base plate secured to the upper edge of said supporting arm with said track secured therebelow, said base plate opening extending parallel and above said track with the ends thereof adapted to abut said upstanding member in either of two extreme positions upon sliding movement of said slide upon said track.

3. A device according to claim 2, said positioning means comprising a guide plate having a central elongated slot slidably receiving said upstanding member therethrough, set screw means carried by said guide plate for adjusting the position of said guide plate upon said upstanding member and for varying the distance of the lower edges of said depending stops from said base plate, said depending stops being secured to the opposite ends of said guide plate at right angles thereto and extending beyond the forward edge of said guide plate in blunt points adapted to facilitate the insertion thereunder of the knocked-down carton.

References Cited in the file of this patent

UNITED STATES PATENTS

| | | |
|---|---|---|
| 900,694 | Barber | Oct. 13, 1908 |
| 2,190,684 | Sims | Feb. 20, 1940 |
| 2,417,302 | Huye | Mar. 11, 1947 |
| 2,489,726 | Salerno | Nov. 29, 1949 |
| 2,545,397 | Wampler | Mar. 13, 1951 |
| 2,559,101 | Wool | July 3, 1951 |
| 2,561,108 | Gerber | July 17, 1951 |
| 2,625,608 | Finn | Jan. 20, 1953 |
| 2,678,765 | Ferguson | May 18, 1954 |